[12] United States Patent
Talvitie et al.

(10) Patent No.: US 9,210,004 B2
(45) Date of Patent: Dec. 8, 2015

(54) RADIO CHANNEL ESTIMATION (71) Applicant: Broadcom Corporation, Irvine, CA (US)

(72) Inventors: Jukka Talvitie, Tampere (FI); Toni Levanen, Tampere (FI)

(73) Assignee: BROADCOM CORPORATION, Irvine, CA (US)

( * ) Notice: Subject to any disclaimer, the term of this patent is extended or adjusted under 35 U.S.C. 154(b) by 47 days.

(21) Appl. No.: 14/032,010

(22) Filed: Sep. 19, 2013

(65) Prior Publication Data

US 2015/0078494 A1   Mar. 19, 2015

(51) Int. Cl.
*H04L 25/02* (2006.01)

(52) U.S. Cl.
CPC .......... *H04L 25/0232* (2013.01); *H04L 25/024* (2013.01)

(58) Field of Classification Search
CPC ............ H04L 25/0202; H04L 25/0204; H04L 25/0206; H04L 25/0208; H04L 25/0222; H04L 27/265; H04L 27/2653; H04L 27/2666; H04L 25/0232; H04L 25/024
USPC ......... 375/259, 260, 262, 265, 267, 340, 341, 375/343; 370/208, 210; 455/68, 69, 702, 455/703, 70, 71
See application file for complete search history.

(56) References Cited

U.S. PATENT DOCUMENTS

| | | | | |
|---|---|---|---|---|
| 6,700,919 | B1 * | 3/2004 | Papasakellariou | 375/130 |
| 7,983,363 | B2 * | 7/2011 | Jayaraman et al. | 375/341 |
| 2002/0150037 | A1 * | 10/2002 | Bao et al. | 370/208 |
| 2003/0147476 | A1 * | 8/2003 | Ma et al. | 375/329 |
| 2004/0264561 | A1 * | 12/2004 | Alexander et al. | 375/232 |
| 2005/0157801 | A1 * | 7/2005 | Gore et al. | 375/260 |
| 2008/0192842 | A1 * | 8/2008 | Fei et al. | 375/260 |
| 2011/0116531 | A1 * | 5/2011 | Gore et al. | 375/213 |

OTHER PUBLICATIONS

Jinfeng Hou, Jian Liu; A Novel Channel Estimation Algorithm for 3GPP LTE Downlink System Using Joint Time-Frequency Two-Dimendsional Iterative Wiener Filter [Communication Technology (ICCT), 2010 12th IEEE International Conference on , vol., no., pp. 289-292, Nov. 11-14, 2010].

S. Haene, A. Burg, P. Luethi, N. Felber and W. Fichtner; "FFT Processor for OFDM Channel Estimation" [Circuits and Systems, 2007. ISCAS 2007. IEEE International Symposium on , vol., no., pp. 1417-1420, May 27-30, 2007].

Peter Hoeher, Stefan Kaiser, and Patrick Robertson; "Two-Dimensional Pilot-Symbol-Aided Channel Estimation by Wiener Filtering" [Acoustics, Speech, and Signal Processing, 1997. ICASSP-97., 1997 IEEE International Conference on, vol. 3, no., pp. 1845-1848 vol. 3, Apr. 21-24, 1997].

(Continued)

*Primary Examiner* — Young T Tse (74) *Attorney, Agent, or Firm* — Oblon, McClelland, Maier & Neustadt, L.L.P.

(57) ABSTRACT

A device that identifies a current channel estimate based on previously received pilot tones; and iteratively, for each instance of receiving a set of new pilot tones: generates an updated channel estimate by replacing contributions to the current channel estimate that depend from the previously received pilot tones with contributions that depend from the set of new pilot tones; and considers for the next iteration the updated channel estimate as the current channel estimate and the set of new pilot tones as the previously received pilot tones.

19 Claims, 6 Drawing Sheets

(56) References Cited

OTHER PUBLICATIONS

Fanghua Weng, Changchuan Yin, Tao Luo; "Channel Estimation for the Downlink of 3GPP-LTE Systems" [Network Infrastructure and Digital Content, 2010 2nd IEEE International Conference on, vol., no., pp. 1042-1046, Sep. 24-26, 2010].

Yushi Shen and Ed Martinez, "WiMAX Channel Estimation: Algorithms and Implementations" [Application Notes, AN3429 Rev. 0 Draft A, Freescale Semiconductor Inc., Jul. 2007, available at http://code.ucsd.edu/~yushen/publications.html].

* cited by examiner

RADIO CHANNEL ESTIMATION

TECHNICAL FIELD

Some non-limiting embodiments of this invention relate generally to wireless communication systems, methods, devices and computer programs, and more specifically relate to estimating a radio channel.

BACKGROUND

Channel estimation in wireless communication provides important knowledge for various system functionalities, and allows data reception in coherent modulation through equalization. In low mobility systems such as the wireless local area network (WLAN) IEEE 802.11 family, channel estimates are conventionally obtained at the beginning of transmission using a specific preamble sequence. At low velocities channel variations are negligible, and so the preamble based channel estimate can be used for the remainder of the transmission time. But this sets boundaries to the maximum tolerable packet size, which can limit the overall throughput of the system.

In high mobility systems the validity of the channel estimate degrades rapidly as time proceeds, which can be overcome by transmitting reference data on frequent intervals and updating the channel during the whole transmission as new reference data becomes available. This technique has been approved for WLAN 802.11ah (draft specification), which terms this approach as a travelling pilot scheme. Until now the pilot carriers in the 802.11 family of radio specifications have used a constant location in frequency, so the travelling pilot procedure is a significant change taken by then 802.11ah group for WLAN systems. The travelling pilot scheme concept may also be utilized in the future High Efficiency WLAN (HEW) amendment following a recent amendment to IEEE 802.11ac.

Consider an orthogonal frequency division multiplexing (OFDM) system. So long as some of the subcarriers do not have reference data such as pilot tones, the missing OFDM subcarriers must be interpolated in the frequency domain. It is often desirable that the frequency response obtained with this interpolation is also smoothened using coarsely estimated channel impulse response characteristics. Both, interpolation and smoothing can be performed using a proper inverse Fast Fourier Transform (IFFT) and Fast Fourier Transform (FFT) processing.

FFT smoothing and corresponding IFFT/FFT interpolation are used to reduce noise in the estimated channel frequency response and possibly to interpolate missing subcarriers in the channel estimation. Such IFFT/FFT processing in the context of UTRAN (LTE) and Worldwide Interoperability for Microwave Access (WiMAX) systems at a paper by Fanghua Weng, Changchuan Yin and Tao Luo entitled "Channel estimation for the downlink of 3GPP-LTE systems," *Network Infrastructure and Digital Content*, 2010 2*nd IEEE International Conference on*, vol., no., pp. 1042-1046, 24-26 Sep. 2010; and also in another paper by Y. Shen and E. F. Martinez entitled "WiMAX Channel Estimation: Algorithms and Implementations", Application Notes, AN3429, Freescale Semiconductor Inc., July 2007, available at http://code.uesd.edu/~yushen/publications.html (last visited Sep. 14, 2013).

The basic idea of the above two papers is to estimate the channel at those subcarrier indices where reference data is available, and then after taking the IFFT over the estimated subcarriers, the resulting impulse response is windowed depending on the estimated characteristics of the channel impulse response. Then finally there is taken a full band FFT of the windowed impulse response to increase the frequency resolution, and thus interpolate the missing subcarriers.

FFT processing is a vital part of the modulation and demodulation techniques in OFDM systems. To reduce implementation complexity of channel estimation as above, compared to other frequency domain filtering techniques, the conventional FFT processor can be extended to support both the modulation techniques and the channel estimation. See for example Haene, S.; Burg, A., Luethi, P., Felber, N. and Fichtner, W.; "FFT Processor for OFDM Channel Estimation," *Circuits and Systems*, 2007. *ISCAS* 2007. *IEEE International Symposium on*, vol., no., pp. 1417-1420, 27-30 May 2007.

The approach described above assumes a suitable pilot tone resolution in the frequency domain. Channel estimation algorithms typically require receipt of a sufficient number of symbols, which depends on how dense are the pilot tones in the tone pattern, before the channel estimate can be calculated. Between these channel estimate intervals the most recent channel estimate is used, because the IFFT/FFT processing can be computationally too challenging to be performed for every received symbol. Also, if the frequency resolution of the pilots in one symbol is not enough, it is not possible to achieve proper symbol-wise channel estimates.

A different channel estimation technique uses a time domain interpolation, but this tends to introduce additional delays which are not tolerable in many cases. The computational complexity of time-frequency interpolation also increases considerably, especially with advanced interpolation methods such as Wiener filter based methods that are reviewed by Hoeher, P., Kaiser, S. and Robertson, P. in "Two-dimensional pilot-symbol-aided channel estimation by Wiener filtering," *Acoustics, Speech, and Signal Processing*, 1997. *ICASSP-97*., 1997 *IEEE International Conference on*, vol. 3, no., pp. 1845-1848 vol. 3, 21-24 Apr. 1997; and also by Jinfeng Hou and Jian Liu in "A novel channel estimation algorithm for 3GPP LTE downlink system using joint time-frequency two-dimensional iterative Wiener filter," *Communication Technology (ICCT)*, 2010 12*th IEEE International Conference on*, vol., no., pp. 289-292, 11-14 Nov. 2010. The former of these two papers indicates that dividing two-dimensional (time-frequency) filters into two separate one-dimensional filters will only slightly decrease the performance.

The example implementations of these teachings that are detailed below focus on the case without the above mentioned time delay, and so at least those non-limiting embodiments time domain interpolation is not an option.

SUMMARY

In a first example aspect of the invention there is a method for controlling a radio device to update a channel estimate. In this aspect the method comprises:

providing a current channel estimate $H_0(k)$ based on previously received pilot tones; and iteratively, for each instance of receiving a set of $N_p$ new pilot tones within an $n^{th}$ time sample index:

generating an updated channel estimate $H_{upd}(k)$ by replacing contributions to the current channel estimate $H_0(k)$ that depend from the previously received pilot tones with contributions that depend from the set of $N_p$ new pilot tones; and considering for the next iteration the updated channel estimate $H_{upd}(k)$ as the current channel estimate $H_0(k)$ and the set of $N_p$ new pilot tones as the previously received pilot tones.

In a second example aspect of the invention there is an apparatus for estimating a channel, where the apparatus comprises a processing system. The processing system itself comprises at least one processor, and at least one memory including computer program code. In this aspect the processing system is configured (that is, the computer program code when executed by the at least one processor) to cause the apparatus to at least:

provide a current channel estimate $H_0(k)$ based on previously received pilot tones; and iteratively, for each instance of receiving a set of $N_p$ new pilot tones within an $n^{th}$ time sample index:

generate an updated channel estimate $H_{upd}(k)$ by replacing contributions to the current channel estimate $H_0(k)$ that depend from the previously received pilot tones with contributions that depend from the set of $N_p$ new pilot tones; and consider for the next iteration the updated channel estimate $H_{upd}(k)$ as the current channel estimate $H_0(k)$ and the set of $N_p$ new pilot tones as the previously received pilot tones.

In a third example aspect of the invention there is a computer readable memory tangibly storing a set of computer readable instructions that are executable by at least one processor for controlling a host radio device to update a channel estimate. In this aspect the computer readable instructions comprise:

code for providing a current channel estimate $H_0(k)$ based on previously received pilot tones; and iterative code that, for each instance of receiving a set of $N_p$ new pilot tones within an $n^{th}$ time sample index:

generates an updated channel estimate $H_{upd}(k)$ by replacing contributions to the current channel estimate $H_0(k)$ that depend from the previously received pilot tones with contributions that depend from the set of $N_p$ new pilot tones; and considers for the next iteration the updated channel estimate $H_{upd}(k)$ as the current channel estimate $H_0(k)$ and the set of $N_p$ new pilot tones as the previously received pilot tones.

These and other aspects are detailed below with more particularity.

DETAILED DESCRIPTION

The examples detailed herein are in the context of a user equipment (UE) operating in a WLAN and using OFDM modulation. These teachings may be utilized with other types of radio access technologies, such as for example evolved Universal Terrestrial Radio Access (E-UTRA) radio access technology (including LTE and LTE-Advanced), Universal Terrestrial Radio Access (UTRA), including Wideband Code Division Multiple Access (WCDMA) and High Speed Packet Access (HSPA), Global System for Mobile Communications (GSM), and the like. OFDM modulation is used in the below examples for simplicity since it provides a clear methodology regarding time and frequency transformations used in the example algorithm described below. But the techniques detailed herein depend only on the presence of pilot tones (alternatively known as pilots, reference tones, and reference signals), and so can be utilized with any other modulation scheme.

Some example embodiments of these teachings provide a novel channel estimation technique for improving channel tracking capability, and can be particularly advantageous in high mobility scenarios in wireless communication systems. The approach detailed herein relies on a set of reference tones which are transmitted at predefined frequencies and time slots. The required densities, in frequency and time, of these reference tones are dependent on the delay spread and the maximum Doppler shift of the channel, respectively.

It is well known that relative velocity between transmitter and receiver affects the Doppler shift in the received signal. With higher relative velocity, the pilot tones should be transmitted more frequently and consequently the channel estimates should be updated more frequently. Some example embodiments of these teachings utilize scattered pilot tone patterns, for example the ones used in LTE and Digital Video Broadcasting (Terrestrial) [DVB-T(2)] can be used for these purposes, but of course the broader teachings herein are not restricted to those specific known pattern designs and can be used with other radio access technologies and/or other patterns of pilot tones, now known or yet to be developed or improved.

Figure 1:
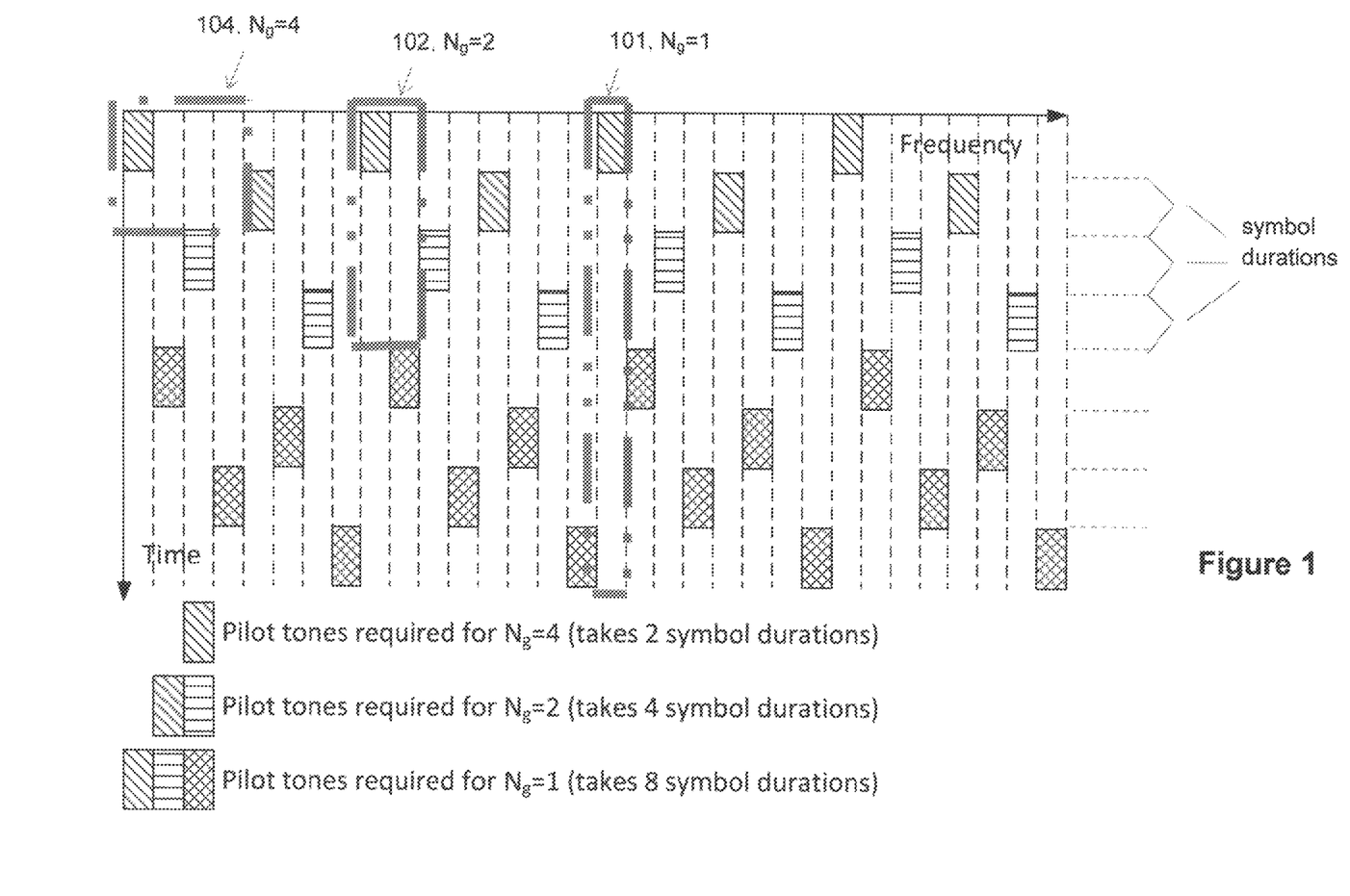
FIG. 1 is a graph in which different vertical columns represent different OFDM subcarriers and different horizontal rows represent different symbol durations, where each shaded block is one pilot tone and different patterns of them form different density groupings for use in channel estimation according to some example embodiments of these teachings.

First consider some general principles for using pilot tones for channel estimation. To allow for a constant presence of reference tones and to avoid excessive system overhead, dedicated pilot tones can be scattered in time and frequency as shown in FIG. 1. As is typical in practical communication systems, assume that the pilot tone resolution in one symbol alone is not sufficiently large to create a useable channel estimate. This means that only after a certain number of received symbols is the pilot resolution high enough to build up the channel estimate.

The frequency interval which indicates just how dense are the pilot tones is termed a grouping index $N_g$. For example, grouping index $N_g=4$ provides that there is one pilot tone available in every $4^{th}$ OFDM subcarrier. FIG. 1 illustrates examples of three different grouping indices, where each vertical row in FIG. 1 represents one OFDM subcarrier and each horizontal row represents one symbol duration in time, and so the OFDM symbols would be indexed along the horizontal (time) axis. Each shaded block in FIG. 1 is a pilot tone, and assume that the tones in FIG. 1 repeat again exactly as illustrated after the eight symbol periods shown (and after the illustrated OFDM subcarriers also). For a density of $N_g=4$ shown as group 104 there is exactly one pilot tone across four OFDM subcarriers and two symbol durations; in the next block (not shown) of 4 OFDM subcarriers there will again be exactly one pilot tone across two symbol durations. For a density of $N_g=2$ shown as group 102 there is exactly one pilot tone across two OFDM subcarriers and this remains true for no more than four symbol durations; and for $N_g=1$ shown as group 101 there is exactly one pilot tone across one OFDM subcarrier and this remains true for no more than eight symbol durations.

If no delay is allowed in the channel estimation process, the pilots cannot be interpolated in time. The conventional practice is to use the currently available channel estimate until enough symbols have been collected to obtain a new estimate. But this imposes a problem in that, depending on the channel update cycle and the user's mobility, the validity of the channel estimate might drop dramatically between the update intervals. Moreover, the accuracy of the new estimate suffers from the fact that part of the pilot data that is used in the current channel estimate is no longer up to date. Some embodiments of these teachings overcome, for example, this prior art problem since in the specific example techniques detailed below the channel estimates are updated after each received symbol, using only real-time pilot data (tones).

It is well known that with a relatively low signal to noise power ratio (SNR), noise becomes the dominating source of error in channel estimation. With low SNR, any improvement in channel tracking capability offers a much lesser improvement to the system performance as compared to a higher SNR scenario, and so the teachings below are well suited to high SNR scenarios, and this advantage can be additionally enhanced in that these channel estimation techniques are fully for use with high throughput modulation and coding schemes while the user is undergoing high mobility. In addition to the SNR considerations above, the example techniques detailed herein are particularly advantageous for fast moving radios where the resulting Doppler effect is non-negligible.

Some example embodiments of this invention improve, for example, the channel estimation accuracy in fast fading channels, which enables increased system throughput also in high mobility scenarios. Whenever new reference data is available, the receiver updates its channel frequency response estimate only around the pilot tone frequencies, in order to reduce computational complexity. The amount/number of pilot tones updated depends on the time domain windowing function design and its truncation width in the frequency domain. To mitigate the negative effects of not updating the whole frequency spectrum, a proper time domain windowing function is used to concentrate the frequency domain energy around the desired pilot tones. Unlike prior art approaches, the techniques detailed herein enable instant channel estimate updates as soon as new pilot tones become available.

Additionally, these certain example embodiments of these techniques also avoid using old pilot tone measurements (i.e. old pilot data) in the channel estimate update. This is achieved in those embodiments with scalable computational complexity that can be adjusted by the windowing function that is put into use.

Figure 2:
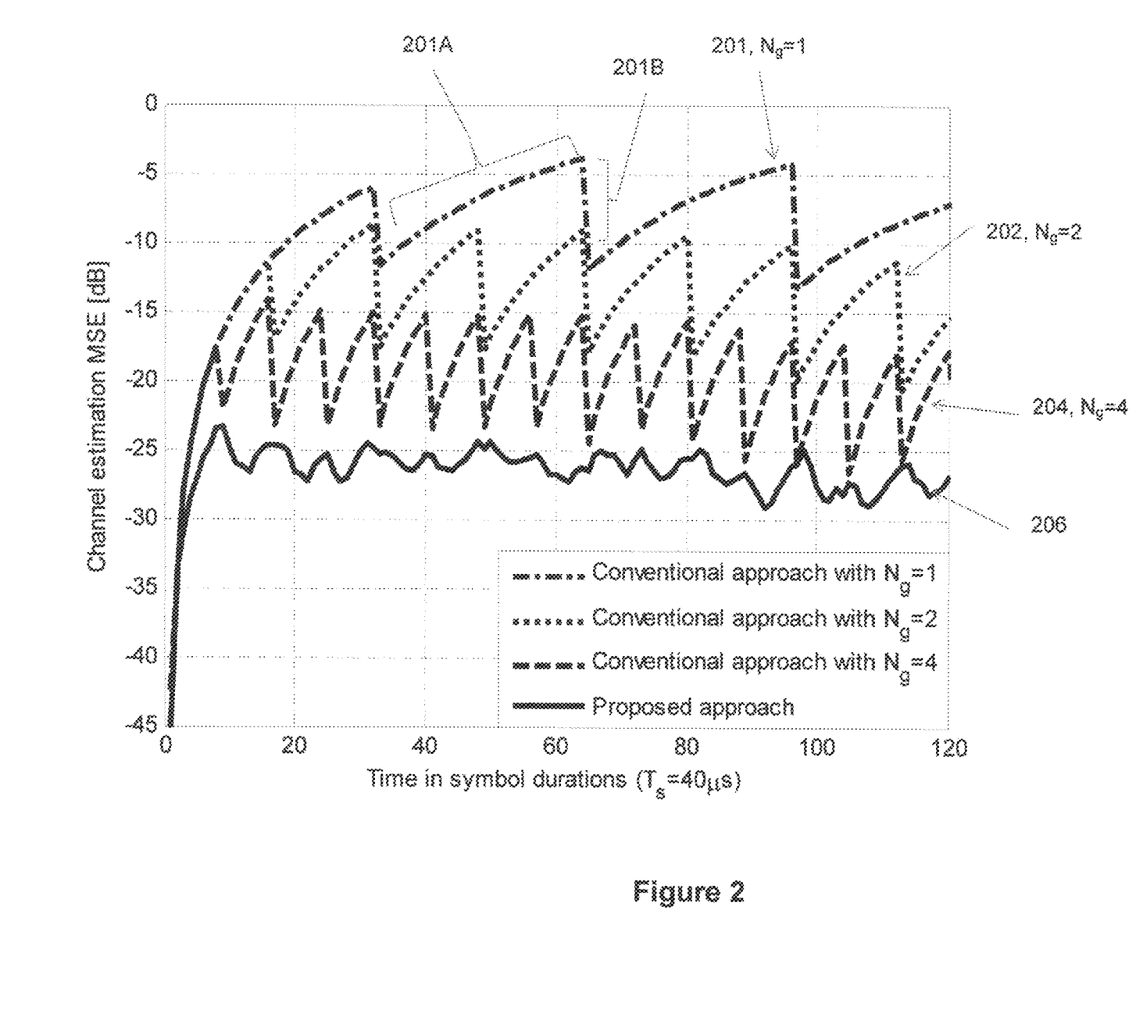
FIG. 2 is a graph charting the performance of one example of the proposed channel estimation algorithm as compared to three prior art channel estimation techniques, in the context of WLAN 802.11ah scenario with the urban micro cell channel model using 179 km/h mobility and 900 MHz carrier frequency.

FIG. 2 is a graph charting the performance of one example of the proposed algorithm in a WLAN 802.11ah scenario with the urban micro cell channel model using 179 km/h mobility and 900 MHz carrier frequency (meaning the Doppler spread is approximately 150 Hz). The SNR is 30 dB, the used bandwidth is 8 MHz, and there are 8 pilot tones transmitted in each symbol (symbol duration=40 µs). The computational complexity of the proposed method is adjusted approximately at the same level with the $N_g=4$ approach.

The sawtooth patterns 201 for $N_g=1$, 202 for $N_g=2$, and 204 for $N_g=4$ in each of the three conventional channel estimation techniques shown at FIG. 2 show the problems that arise when the pilot tone data cannot be processed into a channel estimate in real time. While new symbols are being collected to obtain a new estimate, the receiver continues to use the old estimate but that estimate becomes progressively less accurate due to the pilot data underlying that estimate becoming less relevant to the instantaneous channel the receiver is experiencing. This increasing degradation over time is reflected in FIG. 2 as the rising left-to-right slope on each sawtooth during which the new symbols are being collected, shown by example as 201A for $N_g=1$. The new estimate being put into use is evidenced by the near vertical drop in the mean square error (MSE) on the right side of each sawtooth peak for each of those three conventional channel estimation techniques, shown by example as 201B for $N_g=1$. The best conventional results are obtained where the pilot tones in a pattern are spread over a larger frequency range (higher $N_g$), but FIG. 2 shows quantitatively that the example algorithm following the channel estimation techniques detailed in this paper, shown as plotline 206, exceed performance even of the conventional approach when $N_g=4$ is the pilot tone density. Moreover, the example algorithm provides a much smoother level of accuracy over time.

Now consider a more specific example. Assume that $N_p$ pilot subcarriers are uniformly distributed in the frequency axis (the horizontal axis in FIG. 1). This restricts the maximum length of the channel estimate impulse response to $N_p$ samples. If this condition is not fulfilled, the estimated channel response is not able to reach the same frequency resolution with the true channel. Using the IFFT/FFT processing, the smoothed and interpolated channel estimate in the frequency domain at subcarrier k can be given as equation (1) below.

$$H(k) = \sum_{n=0}^{N-1} w(n) \left[ \frac{1}{N_p} \sum_{l \in \Omega_p} C(l) e^{j2\pi \frac{l}{N} n} \right] e^{-j2\pi \frac{k}{N} n} \quad (1)$$

$$= \sum_{n=0}^{N-1} \sum_{l \in \Omega_p} \frac{1}{N_p} w(n) C(l) e^{j2\pi \frac{l-k}{N} n}$$

$$= \sum_{l \in \Omega_p} C(l) \frac{1}{N_p} \sum_{n=0}^{N-1} w(n) e^{j2\pi \frac{l-k}{N} n}$$

In equation (1): N is the FFT-size (the size of the windowing function); w(n) is an arbitrary unit energy time domain window function with time sample index n and the exponential is a part of the Fourier transform of it in that window function; $\Omega_p$ is a set of available pilot subcarrier indices; and C(l) is the channel frequency tap estimate at subcarrier l where l represents all of the OFDM subcarriers for which there is a channel estimate C(l) and k belongs to the frequency bin vector [0, 1, ... N−1] and l and k may be equal. The sample index n belongs to a time index vector [0, 1, ... N−1] for the discrete Fourier transform (DFT) of the channel estimate C(l), and so n corresponds to a time index inside one inverse DFT (IDFT) of a certain set of channel estimates. When the frequency domain presentation of the pilot tones is transformed to the time domain, the time sample index n represents possible values [0, 1, ... N−1]. The window function w(n) in this example is restricted in the time domain so that no subcarrier has more than one pilot per window.

The weighted sum inside the brackets in the first line of equation (1) is the IFFT over the estimated subcarriers, and the outer sum is the N-point FFT which forces the channel estimate to spread over the whole band. The window function w(n) can be chosen based on the characteristics of the channel impulse response.

In the simplest case the window can be rectangular meaning that the estimated channel impulse is cut at a certain length. Estimating the channel frequency taps in the pilot subcarriers $l \in \Omega_p$ is well known in the art (for example, one valid technique is to take the traditional least squares estimate) and is not further detailed herein.

In conventional channel estimation, if there is no delay tolerated, equation (1) can be used always after enough symbols have been received to achieve the desired grouping index. But in some example embodiments of these teachings the current channel estimate is recursively updated always when new reference data (a new pilot tone in different subcarriers within the window) becomes available. To initiate this recursive approach we begin with an initial channel estimate, and there are several ways to define such an initial estimate. One option is to use a specific preamble which is made available to the receiver, which exploits it to build up an initial estimate. Another option is to use a zero valued initial estimate, which naturally leads to an initial delay depending on the pilot pattern in use, in obtaining the full channel estimate which the recursive process begins to update. Some conventional channel estimation techniques use such a zero valued estimate as their starting point.

However the receiver achieves it, the initial channel estimate is represented as $H_0(k)$. Since the process of updating the channel estimate is recursive, any currently available channel estimate which is to be recursively updated (again) can also be mathematically represented as the same $H_0(k)$. The channel estimate based on a set of new available reference data is then represented by equation (2):

$$H_{newref}(k) = \sum_{l \in \Omega_p} C(l) \frac{1}{N_p} \sum_{n=0}^{N-1} w(n) e^{j2\pi \frac{l-k}{N} n} \quad (2)$$

The current estimate $H_0(k)$ is to be updated based on the new estimate $H_{newref}(k)$. The new estimate alone is generally not sufficient to provide adequate channel estimation since its pilot resolution is too low; as noted above this is done each time a new pilot tone becomes available rather than updating after accumulating them. Updating the current estimate $H_0(k)$ with the new estimate $H_{newref}(k)$ is mathematically simplified in equation (3) below by removing all the sum terms from the current estimate $H_0(k)$ which are dependent on the updated pilot tones, and replacing these with terms based on the new pilot estimates:

$$H_{upd}(k) = H_0(k) - \sum_{l \in \Omega_p} H_0(l) \frac{1}{N_p} \sum_{n=0}^{N-1} w(n) e^{j2\pi \frac{l-k}{N} n} + \quad (3)$$

$$\sum_{l \in \Omega_p} C(l) \frac{1}{N_p} \sum_{n=0}^{N-1} w(n) e^{j2\pi \frac{l-k}{N} n}$$

$$= H_0(k) + \sum_{l \in \Omega_p} (C(l) - H_0(l)) \frac{1}{N_p} \sum_{n=0}^{N-1} w(n) e^{j2\pi \frac{l-k}{N} n}$$

$$= H_0(k) + \sum_{l \in \Omega_p} (C(l) - H_0(l)) \Psi(l, k)$$

where $$\Psi(l, k) = \frac{1}{N_p} \sum_{n=0}^{N-1} w(n) e^{j2\pi \frac{l-k}{N} n}$$

With this form of presentation, it is also noted that with the proposed method, during the iterative update phase the requirement for uniformly spaced pilots can be relaxed. This follows from the last line of equation (3), which states that the new channel estimate at subcarrier index k is $H_0(k)$ summed with a combination of correction terms $(C(l)-H_0(l))$ independently weighted by $\Psi(l,k)$ depending mainly on the distance between l and k. This implies that there is more freedom for the pilot design or, e.g., very unreliable channel estimates can be left out from the channel estimate update process.

The function $\Psi(l,k)$ is constant over time, so its values can be calculated and tabulated in advance to simplify the receiver's processing burden. The function $\Psi(l,k)$ is simply the discrete Fourier transform (DFT) of w(n) centered on subcarrier l and weighted by a factor $1/N_p$. Therefore, for each subcarrier index k, the receiver will be required to perform $2N_p+1$ additions and $N_p$ multiplications. The algorithm of equation (3) can be modified by introducing a specific forgetting factor for adjusting the impact of new pilot information to the current channel estimate. This forgetting factor is the means by which the algorithm's performance can be optimized so as to mitigate effects of updating an acceptable/current channel estimate with unreliable pilot data.

Figure 3:
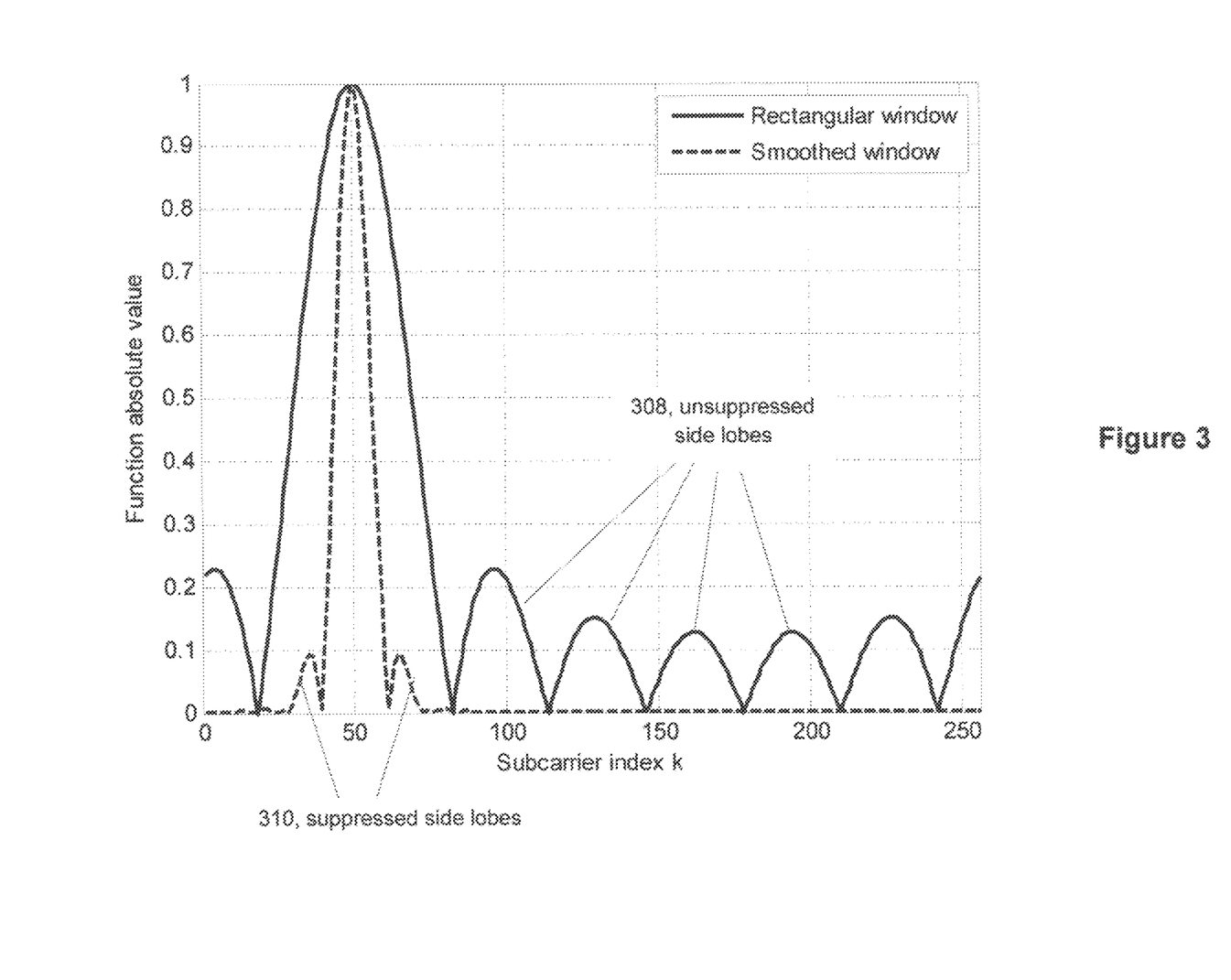
FIG. 3 is a plot of energy for a window function $|\psi(l_i,k)|$ with OFDM subcarrier $l_i=50$ comparing a rectangular windowing function versus a smoother window function for recursive channel estimates according to some embodiments of these teachings.

For the case in which the window function is rectangular, then $|\Psi(l,k)|$ is a sinc-function centered around the subcarrier l on which there is new information, and a considerable portion of the energy is located around the main slope, shown in FIG. 3 as centered on the subcarrier with index k=50. With a proper windowing function it is possible to further suppress the energy of the side slopes, as can be seen visually at FIG. 3 which compares energy (vertical axis) when a rectangular window function is used resulting is side energy lobes 308 against that for a smoothed window function that results in suppressed side energy lobes 310. FIG. 3 shows example responses for the case that l=50. As the energy becomes more concentrated about a given OFDM subcarrier carrying a pilot tone, there is only a small block of the subcarriers around each pilot position has to be updated, since as FIG. 3 shows via the smoothed window plot that there is little or no energy far away from the main slope.

The smoothed window function can create a sinc-like $\Psi(l, k)$ with the main slope covering $N_m$ samples (due to slope symmetry $N_m$ is odd). The updated channel estimate around each updated carrier $l \in \Omega_p$ is shown in equation (4), which updates only $N_m$ subcarriers inside the main slope.

$$H_{upd}(k) = H_0(k) + \sum_{l \in \Omega_p} (C(l) - H_0(l))\Psi(l, k), \quad (4)$$

where $$\Psi(l, k) = 0$$

for $$k \neq m_l,$$

and $$m_l = l - \frac{N_m - 1}{2} + 1, \ldots, l + \frac{N_m - 1}{2}$$

for each $$l \in \Omega_p$$

With processing according to the equation (4) approach, the required number of computational operations per channel estimate update is now $N_m \cdot (2N_p+1)$ additions and $N_m * N_p$ multiplications, including the whole spectrum. Since the computational burden can be scaled by adjusting the windowing function, it can be set to be less, equal or more than the complexity with the prior art/conventional approach that uses grouping for its FFT smoothing. But note that reducing the size of the updated subcarrier block too much might result in instability issues.

Different window functions can be selected for different specific deployments. Selecting a window size involves a trade-off between the computational complexity, robustness and noise tolerance. The wider is the window in the time domain, the less is the computational complexity but the noise will not be smoothed as aggressively, which decreases the channel estimation accuracy in low SNR scenarios. Also, depending on the channel characteristics, the channel tracking capability might suffer since the updated part of the spectrum becomes smaller and the time to update the whole spectrum increases. Nevertheless, based on their own simulations the inventors have found that more than half of the required computational operations can be neglected by only slightly rounding the rectangular window function and updating only part of the channel estimates.

Figure 4A:
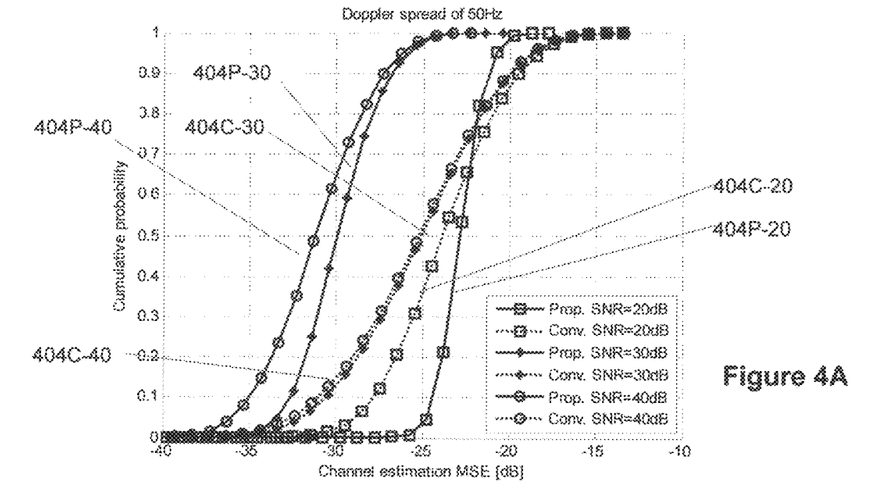
FIGS. 4A and 4B illustrate two examples of cumulative probability distributions of the channel estimation mean square error (MSE) for an example of the new channel estimating algorithm presented herein as compared to a conventional channel estimating approach (which uses $N_g=4$) with Doppler spread D=50 Hz for FIG. 4A and D=150 Hz for FIG. 4B.
Figure 4B:
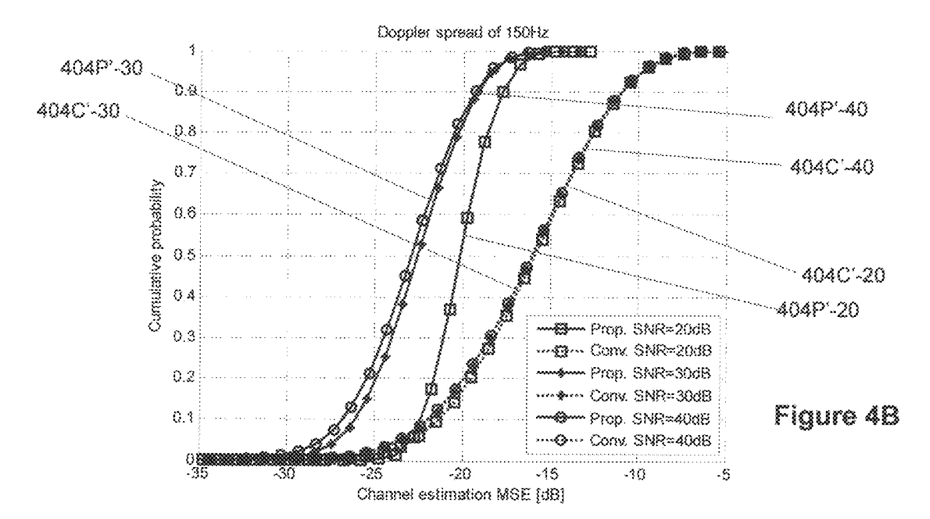

FIGS. 4A and 4B compare cumulative channel estimation MSE distributions of the example new channel estimation algorithm detailed above and the conventional approach with $N_g=4$ (respectively labeled in FIGS. 4A-B as "Prop." shown as plotline 404P and "Cony." shown as plotline 404C). The channel is modeled as a typical sub-urban micro cell with root mean square (rms) delay of approximately 200 ns and a maximum excess delay of 1 μs. The results are given for two different Doppler spread values, D=50 Hz (FIG. 4A) and D=150 Hz (FIG. 4B), which correspond to user velocities of 11 and 32 km/h at the used 5 GHz carrier frequency (e.g. with 900 MHz carrier frequency the corresponding velocities would be 60 and 179 km/h). The window size used in the example new channel estimation algorithm plotted at FIGS. 4A-B is chosen so that the computational complexity is approximately the same as the conventional approach to which it is being compared in those figures. The plotlines at FIG. 4A are as follows: 404P-20, 404P-30 and 404P-40 reflect results of the new channel estimation algorithm detailed above with SNRs of 20 dB, 30 dB and 40 dB respectively; 404C-20, 404C-30 and 404C-40 reflect results of a conventional channel estimation algorithm with SNRs of 20 dB, 30 dB and 40 dB respectively. The plotlines at FIG. 4B are similar: 404P'-20, 404P'-30 and 404P'-40 reflect results of the new channel estimation algorithm detailed above with SNRs of 20 dB, 30 dB and 40 dB respectively; 404C'-20, 404C'-30 and 404C'-40 reflect results of a conventional channel estimation algorithm with SNRs of 20 dB, 30 dB and 40 dB respectively.

In some embodiments of the invention, the new channel estimation algorithm achieves better channel estimation accuracy in higher mobility scenarios with high SNR values. This can be especially seen at FIG. 4B in the D=150 Hz scenario, in which the channel estimation accuracy of the conventional method 404C'-20, 404C'-30 and 404C'-40 is not affected by the SNR increment. This is because its performance is already limited by the channel mobility. As the SNR decreases, the performance of the new channel estimation algorithm drops considerably faster than the performance of the conventional method. This is because of the fixed windowing design; the windowing selection was 'fixed' in that it was chosen to match the computational complexity of the conventional channel estimation in order to illustrate a more meaningful comparison at FIGS. 4A-B. This externally-driven windowing design necessarily allows less smoothing for the new channel estimation algorithm. In a practical deployment not restricted to match complexity with other techniques for comparison purposes, the window size would be adaptively modified according to SNR changes, which would readily control the magnitude of the performance drop.

Some embodiments of these teachings provide, for example, the technical effect of enabling fast channel tracking in high mobility scenarios, which allows a higher system throughput particularly in high SNR environments. These teachings may also offer a tradeoff between OFDM symbol duration, the expected maximum Doppler and the pilot tone overhead so as to optimize a given algorithm deployment for a specific scenario. Additionally, in some embodiments, the computational complexity of the new algorithm can be adjusted via selecting the described windowing function, and, in some embodiments, in fact can be made to be less complex than prior art channel estimation algorithms. At least in an OFDM deployment the algorithms presented herein may function best with pilot tones in OFDM symbols more frequently in the time domain than other conventional algorithms that utilize time domain interpolation but FIG. 2 shows substantial performance improvements.

Figure 5:
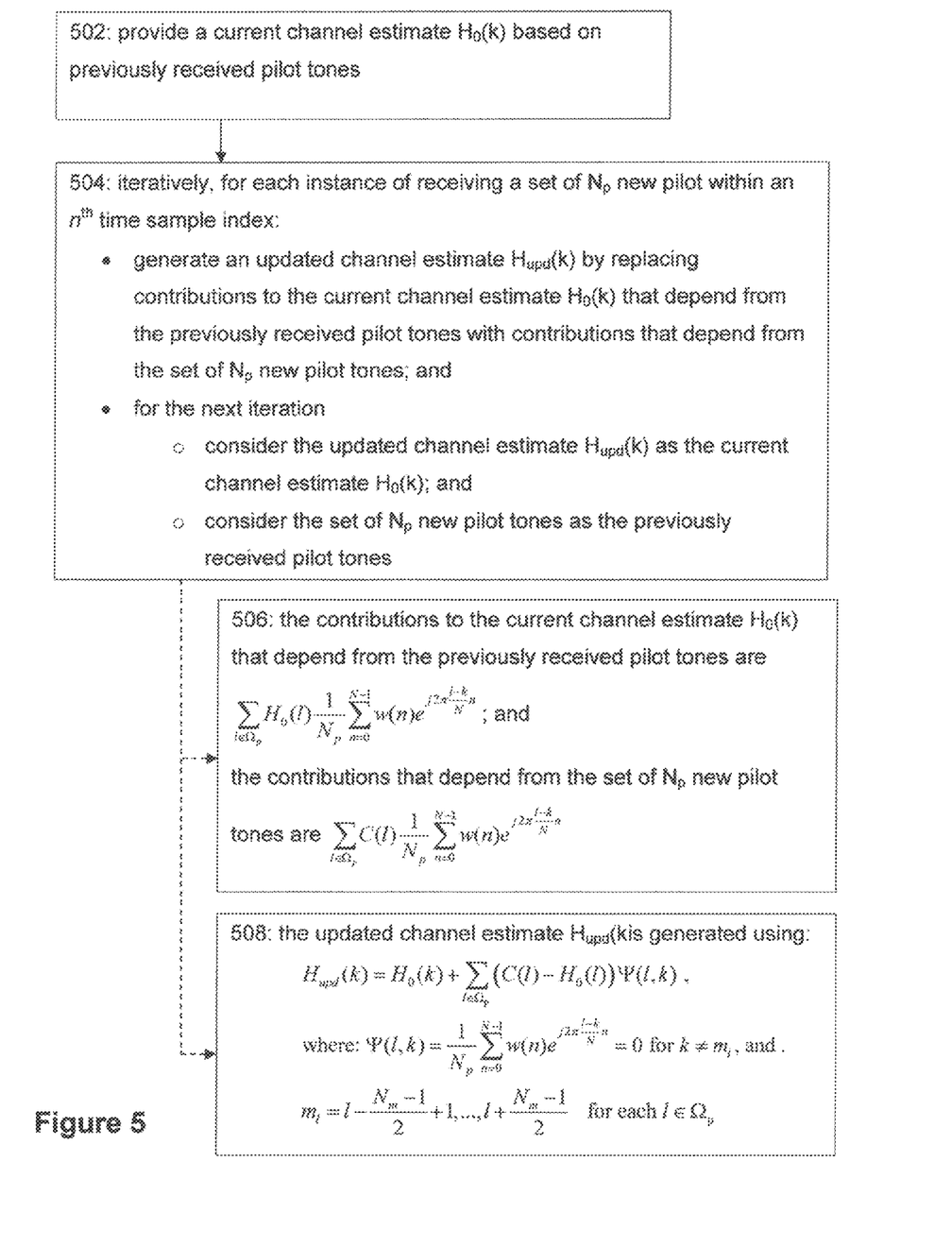
FIG. 5 is a logic flow diagram that illustrates the operation of a method, a result of execution of by apparatus, and execution of computer instructions comprising code embodied on a computer readable memory, in accordance with some embodiments of this invention.

FIG. 5 presents a summary of the above teachings for controlling a radio device to update a channel estimate. The radio device may for example be a receiver disposed in a user equipment. FIG. 5 begins at block 502 where there is provided a current channel estimate $H_0(k)$ based on previously received pilot tones. To initialize the algorithm this current channel estimate can be the initial channel estimate, which as detailed above could be built up by the receiver from a known/specific preamble or it could be built over time from a zero valued initial estimate. While the algorithm is running this current channel estimate is the value of H(k) that was most recently output from the algorithm [e.g., the output of equations (3) or (4)] before the new set of pilot tones were received and processed into the new update.

Block 504 begins the recursive process: iteratively, for each instance of receiving a set of $N_p$ new pilot tones within an $n^{th}$ time sample index, there is generated an updated channel estimate $H_{upd}(k)$ by replacing contributions to the current channel estimate $H_0(k)$ that depend from the previously received pilot tones with contributions that depend from the set of $N_p$ new pilot tones. Now with the updated channel estimate $H_{upd}(k)$ computed we simply need to re-name entities to re-enter block 504 for the next iteration, and so for the next iteration the updated channel estimate $H_{upd}(k)$ is considered as the current channel estimate $H_0(k)$, and the set of $N_p$ new pilot tones is considered as the previously received pilot tones. Further details shown at FIG. 5 represent some of the embodiments that were detailed above by examples which do not limit the broader teachings herein.

In some embodiments according to the above description there was described the windowing function w(n). The windowing function is used to define a frequency span within which are disposed each of the sets of $N_p$ new pilot tones that are received at block 504. In a particular embodiment detailed above each set of $N_p$ pilot tones are uniformly distributed across that frequency span, but this is not necessary in every implementation as noted above in case certain unreliable estimates are to be excluded from the update process. In that particular but non-limiting OFDM-type example using uniformly distributed pilot tones, the windowing function defined an OFDM symbol size N within which each set of the $N_p$ pilot tones are obtained. In this case the updated channel estimate $H_{upd}(k)$ generated at block 504 uses a size N FFT on the windowing function which in the detailed explanation above is expresses as $$\sum_{n=0}^{N-1} w(n)e^{j2\pi \frac{l-k}{N}n},$$

where l is an index of subcarrier or frequency band of the frequency span in which lie the set of $N_p$ new pilot tones of the $n^{th}$ time sample index; and k is a subcarrier or frequency band for which the channel estimate applies. While the above examples assumed an OFDM system so that the pilot tones lay in distinct OFDM subcarriers, in other non-OFDM systems we can consider the frequency in which each distinct pilot tone lay as a frequency band.

Block 504 describes replacing contributions to the current channel estimate $H_0(k)$; this is how the channel estimate is updated instantaneously with the new pilot data while removing influence of the old pilot data. Equation (3) shows this replacement directly. Specifically and as shown particularly at block 506, the contributions to the current channel estimate $H_0(k)$ that depend from the previously received pilot tones are $$\sum_{l \in \Omega_p} H_0(l) \frac{1}{N_p} \sum_{n=0}^{N-1} w(n)e^{j2\pi \frac{l-k}{N}n};$$

and the contributions that depend from the set of $N_p$ new pilot tones are $$\sum_{l \in \Omega_p} C(l) \frac{1}{N_p} \sum_{n=0}^{N-1} w(n)e^{j2\pi \frac{l-k}{N}n};$$

where $\Omega_p$ is a set of available subcarrier or frequency band indices having a pilot tone; C(l) is an estimate of a channel frequency tap at subcarrier or frequency band l; and the other terms are explained above for the windowing function.

There are advantages described above for using a smoothed window function, and Equation (4) is one way to implement this by updating only $N_m$ subcarriers/frequency bands inside the main slope in each of the iterations. In this case the updated channel estimate $H_{upd}(k)$ from block 504 is generated using the equation shown at block 508:

$$H_{upd}(k) = H_0(k) + \sum_{l \in \Omega_p} (C(l) - H_0(l))\Psi(l, k),$$

where: $\Psi(l, k) = \frac{1}{N_p} \sum_{n=0}^{N-1} w(n)e^{j2\pi \frac{l-k}{N}n} = 0$ for $k \neq m_l$, and $$m_l = l - \frac{N_m - 1}{2} + 1, \ldots, l + \frac{N_m - 1}{2} \text{ for each } l \in \Omega_p$$

The logic diagram of FIG. 5 may be considered to illustrate the operation of a method, and a result of execution of a computer program stored in a computer readable memory, and a specific manner in which components of an electronic radio device are configured to cause that electronic device to operate. For example, such an electronic radio device may be a receiver of a user equipment, whether hand mobile or fixedly attached to a vehicle such as a car or a train; or it may be one or more components of a user equipment/radio such as a modem, chipset, or the like. Any of these may be referred to as an apparatus for updating a channel estimate, where for example the apparatus can be the radio device/user equipment or one or more components thereof such as the above examples of a modem and/or a chipset, or a processing system comprising at least one processor and a memory storing computer program code. The various blocks shown in FIG. 5 may also be considered as a plurality of coupled logic circuit elements constructed to carry out the associated function(s), or specific result of strings of computer program code or instructions stored in a memory.

Such blocks and the functions they represent are non-limiting examples, and may be practiced in various components such as integrated circuit chips and modules, and the example embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the example embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a user equipment/radio device, to perform the various functions summarized at FIG. 5 and (c) circuits, such as a microprocessor(s) or a portion of a microprocessor(s), that require software or firmware for operation, even if the software or firmware is not physically present. This definition of 'circuitry' applies to all uses of this term in this specification, including in any claims. As a further example, as used in this specification, the term "circuitry" would also cover an implementation of merely a processor (or multiple processors) or portion of a processor and its (or their) accompanying software and/or firmware. The term "circuitry" also covers, for example, a baseband integrated circuit or an application specific integrated circuit (ASIC) or a similar integrated circuit which may be in the mobile user equipment/radio device or even in a network node which operates according to these teachings.

Figure 6:
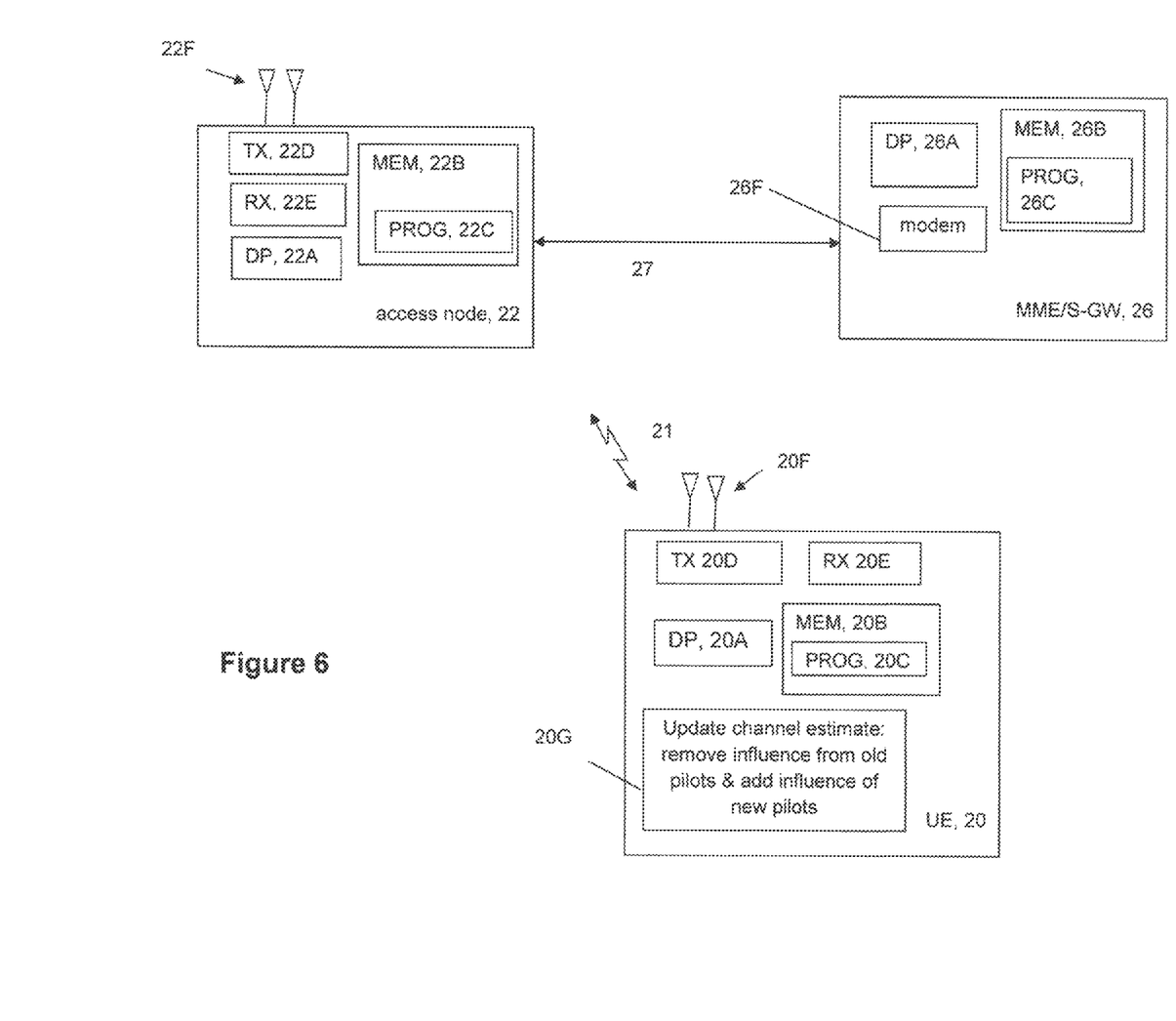
FIG. 6 is a simplified block diagram of a UE in communication with a network access node such as an AP, eNB or other such base station, and illustrates example electronic devices suitable for use in practicing some embodiments of this invention.

Reference is now made to FIG. 6 for illustrating a simplified block diagram of various electronic devices and apparatus that are suitable for use in practicing the some embodiments of this invention. In FIG. 6 a radio network access node 22 is adapted for communication over a wireless link 21 with an apparatus, such as a mobile terminal or UE 20. The access node 22 may be any access node such as an eNB or a NodeB (including frequency selective repeaters and remote radio heads) of any wireless network, such as E-UTRAN/LTE/LTE-Advanced, UTRAN, HSDPA, WCDMA, GSM, GERAN, or an access point AP in a WLAN/WiMAX network, or other such base stations/access nodes.

There may also be in some network deployments a network control element or other higher network entity such as a radio network controller RNC in the case of a UTRAN and WCDMA/HSDPA network, or a mobility management entity MME for the case of LTE/LTE-Advanced networks in which case the MME may also serve as the serving gateway S-GW as shown at FIG. 6. This higher network entity 26 generally provides connectivity with the core cellular network and with further networks (e.g., a publicly switched telephone network PSTN and/or a data communications network/Internet). Where the network access node is an AP of a WLAN, this AP may have a direct connection to the data network or it may be through a cellular network and pass through an eNB/base station first.

The UE 20 includes processing means such as at least one data processor (DP) 20A, storing means such as at least one computer-readable memory (MEM) 20B storing at least one computer program (PROG) 20C, and communication means such as a transmitter TX 20D and a receiver RX 20E for bidirectional wireless communications with the access node 22 using the operative radio access technology. All of the relevant wireless communications are facilitated via one or more antennas 20F. Also stored in the MEM 20B at reference number 20G are the computer code or algorithms for the UE to operate according to some example embodiments above to update a current channel estimate when new pilot data is received/available by replacing contributions to the current channel estimate due to old pilot data with contributions from the new pilot data, according the teachings detailed above by non-limiting example.

The access node 22 also includes processing means such as at least one data processor (DP) 22A, storing means such as at least one computer-readable memory (MEM) 22B storing at least one computer program (PROG) 22C, and communication means such as a transmitter TX 22D and a receiver RX 22E for bidirectional wireless communications with the UE 20 on the link. All the wireless communications are via one or more antennas 22F, which for an eNB are typically implemented as an antenna array. The access node 22 stores at block 22B its own computer software code or algorithms to cause the network side to operate as detailed above by properly disposing the pilot tones across the subcarriers in a pattern that it informs to the UE 20 so the UE 20 knows where t6p look for the pilot data it will use to update its channel estimate. In other deployments the access node 22 may also have the computer program in its local memory to implement the channel updating procedure itself.

Also at FIG. 6 is shown a higher network entity 26 above the radio access node 22. In UTRAN (for example, HSDPA and WCDMA) this higher network entity 26 may be a radio network controller RNC, whereas in LTE/LTE-Advanced this entity 26 may be a MME and/or a S-GW as noted above. In WLAN/WiMAX there may or may not be a higher network entity. However implemented, if there is such a higher network entity 26 it will include processing means such as at least one data processor (DP) 26A, storing means such as at least one computer-readable memory (MEM) 26B storing at least one computer program (PROG) 26C, and communication means such as a modem 26F for bidirectional communications with the access nodes 22 and with other access nodes under its control or coordination over the data and control link 27.

While not particularly illustrated for the UE 20 or the access node 22, those devices are also assumed to include as part of their wireless communicating means a modem and/or a chipset and/or an antenna chip which may or may not be inbuilt onto a radiofrequency (RF) front end module within those devices 20, 22 and which also operates according to the teachings set forth above.

At least one of the PROGs 20C of the UE 20 is assumed to include a set of program instructions that, when executed by the associated DP 20A, enable the device to operate in accordance with the some embodiments of this invention, as detailed above. The access node 22 may also have software stored in its respective MEM 22B to implement certain aspects of these teachings, as detailed above. In these regards the some embodiments of this invention may be implemented at least in part by computer software stored on the MEM 20B, 22B, which is executable by the DP 22A of the access node 22, and/or by the DP 20A of the UE 20; or by hardware, or by a combination of tangibly stored software and hardware (and tangibly stored firmware) in any one or more of these devices 20, 22. In this manner the respective DP with the MEM and stored PROG may be considered a data processing system. Electronic devices implementing these aspects of the invention need not be the entire devices as depicted at FIG. 6 or may be one or more components of same such as the above described tangibly stored software, hardware, firmware and DP, a system on a chip SOC, an application specific integrated circuit ASIC, a digital signal processor DSP, a modem, an antenna module, or a RF front end module as noted above.

In general, some of the various embodiments of the UE 20 can include, but are not limited to personal portable digital assistance devices, hand-mobile radios, radios mounted in a vehicle such as a car or train, and wearable or implanted radios any of which have wireless communication capabilities, including but not limited to cellular and other mobile phones (including smart phones), navigation devices, laptop/palmtop/tablet computers, digital cameras and music devices, Internet appliances, USB dongles and data cards, machine-to-machine communication devices, and the like.

Various non-limiting embodiments of the computer readable MEMs 20B, 22B, 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various non-limiting embodiments of the DPs 20A, 22A, 26A include but are not limited to general purpose computers, special purpose computers, microprocessors, digital signal processors (DSPs) and multi-core processors.

Various modifications and adaptations to the foregoing example embodiments of this invention may become apparent to those skilled in the relevant arts in view of the foregoing description. While some non-limiting embodiments have been described above in the context of the WLAN and OFDM systems, as noted above the example embodiments of this invention are not limited for use with only these particular types of wireless radio access technology networks and signal modulations.

Further, some of the various features of the above non-limiting embodiments may be used to advantage without the corresponding use of other described features. The foregoing description should therefore be considered as merely illustrative of the principles, teachings and some embodiments of this invention, and not in limitation thereof.

What is claimed is:

1. A method for controlling a radio device to update a channel estimate, the method comprising:

providing a current channel estimate $H_o(k)$ based on previously received pilot tones; and iteratively, for each instance of receiving a set of $N_p$ new pilot tones within an $n^{th}$ time sample index, where N and n are integer values:

generating an updated channel estimate $H_{upd}(k)$ by replacing contributions to the current channel estimate $H_o(k)$ that depend from the previously received pilot tones with contributions that depend from the set of $N_p$ new pilot tones; and considering for the next iteration the updated channel estimate $H_{upd}(k)$ as the current channel estimate $H_o(k)$ and the set of $N_p$ new pilot tones as the previously received pilot tones.

2. The method according to claim 1, wherein a windowing function w(n) is used to define a frequency span in which each of received sets of $N_p$ new pilot tones are disposed.

3. The method according to claim 1, wherein the set of $N_p$ new pilot tones within each $n^{th}$ time sample index are uniformly distributed in frequency.

4. The method according to claim 2, wherein the windowing function is defined for a symbol size N within which each set of the $N_p$ new pilot tones are obtained.

5. The method according to claim 2, wherein the updated channel estimate $H_{upd}(k)$ is obtained by performing on the windowing function a size N Fast Fourier transform FFT such that $$\sum_{n=0}^{N-1} w(n) e^{j2\pi \frac{l-k}{N} n};$$

where l is an index of subcarrier or frequency band of the frequency span within which is received the set of $N_p$ new pilot tones of the $n^{th}$ time sample index; and k is a subcarrier or frequency band for which the updated channel estimate applies.

6. The method according to claim 5, wherein:

the contributions to the current channel estimate $H_o(k)$ that depend from the previously received pilot tones are $$\sum_{l \in \Omega_p} H_0(l) \frac{1}{N_p} \sum_{n=0}^{N-1} w(n) e^{j2\pi \frac{l-k}{N} n};$$

and the contributions that depend from the set of $N_p$ new pilot tones are $$\sum_{l \in \Omega_p} C(l) \frac{1}{N_p} \sum_{n=0}^{N-1} w(n) e^{j2\pi \frac{l-k}{N} n};$$

where: $\Omega_p$ is a set of available subcarrier or frequency band indices having a pilot tone; and C(l) is an estimate of a channel frequency tap at subcarrier or frequency band l.

7. The method according to claim 6, wherein the updated channel estimate $H_{upd}(k)$ is generated using:

$$H_{upd}(k) = H_0(k) + \sum_{l \in \Omega_p} (C(l) - H_0(l)) \Psi(l, k),$$

where: $\Psi(l, k) = \frac{1}{N_p} \sum_{n=0}^{N-1} w(n) e^{j2\pi \frac{l-k}{N} n} = 0$ for $k \neq m_l$, and $m_l = l - \frac{N_m - 1}{2} + 1, \ldots, l + \frac{N_m - 1}{2}$ for each $l \in \Omega_p$ and further where a total of $N_m$ subcarriers or frequency bands are updated in each iteration.

8. The method according to claim 1, wherein the radio device comprises at least a receiver disposed in a user equipment.

9. A user equipment for estimating a channel, the user equipment comprising:

a receiver configured to receive pilot tones; and processing circuitry configured to provide a current channel estimate $H_o(k)$ based on previously received pilot tones; and iteratively, for each instance of receiving a set of $N_p$ new pilot tones within an $n^{th}$ time sample index, where N and n are integer values:

generate an updated channel estimate $H_{upd}(k)$ by replacing contributions to the current channel estimate $H_o(k)$ that depend from the previously received pilot tones with contributions that depend from the set of $N_p$ new pilot tones; and consider for the next iteration the updated channel estimate $H_{upd}(k)$ as the current channel estimate $H_o(k)$ and the set of $N_p$ new pilot tones as the previously received pilot tones.

10. The user equipment according to claim 9, wherein a windowing function w(n) is used to define a frequency span in which each of received sets of $N_p$ new pilot tones are disposed.

11. The user equipment according to claim 10, wherein the set of $N_p$ new pilot tones within each $n^{th}$ time sample index are uniformly distributed in frequency.

12. The user equipment according to claim 10, wherein the windowing function is defined for a symbol size N within which each set of the $N_p$ new pilot tones are obtained.

13. The user equipment according to claim 10, wherein the updated channel estimate $H_{upd}(k)$ is obtained by performing on the windowing function a size N Fast Fourier transform FFT such that $$\sum_{n=0}^{N-1} w(n) e^{j2\pi \frac{l-k}{N} n};$$

where
l is an index of subcarrier or frequency band of the frequency span within which is received the set of $N_p$ new pilot tones of the $n^{th}$ time sample index; and
k is a subcarrier or frequency band for which the updated channel estimate applies.

14. The user equipment according to claim 13, wherein:
the contributions to the current channel estimate $H_o(k)$ that depend from the previously received pilot tones are $$\sum_{l \in \Omega_p} H_0(l) \frac{1}{N_p} \sum_{n=0}^{N-1} w(n) e^{j2\pi \frac{l-k}{N} n};$$

and
the contributions that depend from the set of $N_p$ new pi ones are $$\sum_{l \in \Omega_p} C(l) \frac{1}{N_p} \sum_{n=0}^{N-1} w(n) e^{j2\pi \frac{l-k}{N} n};$$

where: $\Omega_p$ is a set of available subcarrier or frequency band indices having a pilot tone;
and C(l) is an estimate of a channel frequency tap at subcarrier or frequency band l.

15. The user equipment according to claim 14, wherein the updated channel estimate $H_{upd}(k)$ is generated using:

$$H_{upd}(k) = H_0(k) + \sum_{l \in \Omega_p} (C(l) - H_0(l)) \Psi(l, k),$$

where: $\Psi(l, k) = \frac{1}{N_p} \sum_{n=0}^{N-1} w(n) e^{j2\pi \frac{l-k}{N} n} = 0$ for $k \neq m_l$, and $$m_l = l - \frac{N_m - 1}{2} + 1, \ldots, l + \frac{N_m - 1}{2} \text{ for each } l \in \Omega_p$$

and further where a total of $N_m$ subcarriers or frequency bands are updated in each iteration.

16. A user equipment comprising:
a receiver configured to receive pilot tones; and
processing circuitry configured to
identify a current channel estimate based on previously received pilot tones; and
iteratively, for each instance of receiving a set of new pilot tones:
generate an updated channel estimate by replacing contributions to the current channel estimate that depend from the previously received pilot tones with contributions that depend from the set of new pilot tones; and
consider for the next iteration the updated channel estimate as the current channel estimate and the set of new pilot tones as the previously received pilot tones.

17. The user equipment of claim 16, wherein
a windowing function is used to define a frequency span in which each of the received sets of new pilot tones are disposed.

18. The user equipment of claim 16, wherein
the set of new pilot tones are uniformly distributed in frequency.

19. The user equipment of claim 18, wherein the windowing function is defined for a symbol size N within which each set of the new pilot tones are obtained.

* * * * *